(12) United States Patent
Wei et al.

(10) Patent No.: US 10,726,446 B2
(45) Date of Patent: Jul. 28, 2020

(54) METHOD AND APPARATUS FOR PUSHING INFORMATION (71) Applicant: Baidu Online Network Technology (Beijing) Co., Ltd., Beijing (CN)

(72) Inventors: Tian Wei, Beijing (CN); Wenkai Dai, Beijing (CN); Kai Sun, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 338 days.

(21) Appl. No.: 15/617,337

(22) Filed: Jun. 8, 2017

(65) Prior Publication Data
US 2018/0181988 A1 Jun. 28, 2018

(51) Int. Cl.
*G06Q 30/02* (2012.01)
*G06F 40/00* (2020.01)
*G06F 16/00* (2019.01)
*G06F 16/93* (2019.01)
*G06F 40/30* (2020.01)
(Continued)

(52) U.S. Cl.
CPC ......... *G06Q 30/0256* (2013.01); *G06F 16/93* (2019.01); *G06F 16/9535* (2019.01); *G06F 40/247* (2020.01); *G06F 40/289* (2020.01); *G06F 40/30* (2020.01); *G06Q 30/0255* (2013.01); *G06Q 30/0277* (2013.01)

(58) Field of Classification Search
CPC .......... G06Q 30/0256; G06Q 30/0255; G06Q 30/0277; G06F 40/30; G06F 40/247; G06F 40/289; G06F 16/93; G06F 16/9535
See application file for complete search history.

(56) References Cited

U.S. PATENT DOCUMENTS

| 2007/0150342 | A1* | 6/2007 | Law | G06Q 30/02 705/14.52 |
| 2015/0287080 | A1* | 10/2015 | Geetha | G06Q 30/0256 705/14.54 |
| 2017/0017998 | A1* | 1/2017 | Dhawan | G06Q 30/0255 |

FOREIGN PATENT DOCUMENTS

| CN | 102081642 A | 6/2011 |
| CN | 105893410 A | 8/2016 |

(Continued)

OTHER PUBLICATIONS

Patent Translate, Espacenet bibliography data: CN105893410 (A) Aug. 24, 2016 pp. 1-30.*

(Continued)

*Primary Examiner* — Raquel Alvarez
(74) *Attorney, Agent, or Firm* — Nixon Peabody LLP (57) ABSTRACT

The present disclosure discloses a method and apparatus for pushing information. A specific embodiment of the searching method comprises: dividing words in a target text to generate a set of phrases; calculating a term frequency inverse document frequency for each of the phrases in the set in the target text; acquiring similarities between preset candidate keywords and the each of the phrases; calculating relevance of the candidate keywords to the target text, based on the term frequency inverse document frequency for the each of the phrases in the target text and the similarities between the candidate keywords and the each of the phrases; and selecting a to-be-pushed candidate keyword from the candidate keywords, and pushing the to-be-pushed candidate keyword to a first user terminal based on a preset relevance threshold, or based on the relevance and a preset pushing quantity.

12 Claims, 5 Drawing Sheets

(51) Int. Cl.
    *G06F 40/247*     (2020.01)
    *G06F 40/289*     (2020.01)
    *G06F 16/9535*     (2019.01)

(56) References Cited

FOREIGN PATENT DOCUMENTS

| | | |
|---|---|---|
| JP | 2013-20462 A | 1/2013 |
| JP | 2016-62275 A | 4/2016 |

OTHER PUBLICATIONS

Verizon transforms local search with Launch of New SuperPages. com Web site. Mar. 1, 2004. Newswire. (Year: 2004).*

* cited by examiner

METHOD AND APPARATUS FOR PUSHING INFORMATION

CROSS-REFERENCE TO RELATED APPLICATION

This application is related to and claims priority from Chinese Application No. 201611216735.3, filed on Dec. 26, 2016, entitled "Method and Apparatus for Pushing Information" the entire disclosure of which is hereby incorporated by reference.

TECHNICAL FIELD

The present disclosure relates to the field of computer technology, specifically to the field of Internet technology, and more specifically to a method and apparatus for pushing information.

BACKGROUND

Searching advertising is an important part of the Internet business marketization. Using the matching relevance between the questions searched by the Internet user and the keyword purchased by the advertiser, the search engine presents to the Internet user advertisings she might be interested in, and charges the advertiser a certain fee for the user's click on the advertising, thus achieving a win-win situation among the search engine, the Internet user and the advertiser. During this process, the keyword purchased by the advertiser is an important link connecting the three parties. Therefore, how to choose the right keyword is one of the basic questions for the many advertisers and the Search Engine Marketing (SEM) companies.

However, the existing keyword filtering method is usually based on the words purchased by the advertiser and calculates the literal relevance of the words to the candidate keywords as the relevance of the advertiser's business to the candidate keywords. However, this method has a low accuracy problem.

SUMMARY

The present disclosure provides an improved method and apparatus for pushing information, in order to solve the technical problem mentioned in the foregoing Background section.

In a first aspect, the present disclosure provides a method for pushing information, comprising: dividing words in a target text to generate a set of phrases; calculating a term frequency inverse document frequency for each of the phrases in the set in the target text; acquiring similarities between preset candidate keywords and the each of the phrases; calculating relevance of the candidate keywords to the target text, based on the term frequency inverse document frequency for the each of the phrases in the target text and the similarities between the candidate keywords and the each of the phrases; and selecting a to-be-pushed candidate keyword from the candidate keywords, and pushing the to-be-pushed candidate keyword to a first user terminal based on a preset relevance threshold, or based on the relevance and a preset pushing quantity.

In some embodiments, the calculating relevance of the candidate keywords to the target text, based on the term frequency inverse document frequency for the each of the phrases in the target text and the similarities between the candidate keywords and the each of the phrases comprises: for the each of the phrases in the set, multiplying the similarity between the candidate keywords and the phrase by the term frequency inverse document frequency of the phrase in the target text, and adding multiplication products to obtain the relevance of the candidate keywords to the target text.

In some embodiments, after the pushing the to-be-pushed candidate keyword to a first user terminal, the method further comprises: establishing a correspondence relationship between the to-be-pushed candidate keyword and the target text; and in response to detecting a searching operation of a second user terminal to the to-be-pushed candidate keyword, pushing a text corresponding to the to-be-pushed candidate keyword to the second user terminal.

In some embodiments, the calculating a term frequency inverse document frequency of each of the phrases in the set in the target text, comprises: counting an inverse document frequency of the each of the phrases appearing in a preset text set; counting a frequency of the each of the phrases in the target text; and calculating a product of the inverse document frequency and the frequency as the term frequency inverse document frequency of the phrases.

In some embodiments, after generating a set of phrases, the method further comprises: deleting stop words from the set of phrases.

In a second aspect, the present disclosure provides an apparatus for pushing information, comprising: a generating unit, configured to divide words in a target text to generate a set of phrases; a first calculation unit, configured to calculate a term frequency inverse document frequency for each of the phrases in the set in the target text; an acquiring unit, configured to acquire similarities between preset candidate keywords and the each of the phrases; a second calculation unit, configured to calculate relevance of the candidate keywords to the target text, based on the term frequency inverse document frequency for the each of the phrases in the target text and the similarities between the candidate keywords and the each of the phrases; and a first pushing unit, configured to select a to-be-pushed candidate keyword from the candidate keywords, and pushing the to-be-pushed candidate keyword to a first user terminal based on a preset relevance threshold, or based on the relevance and a preset pushing quantity.

In some embodiments, the second calculation unit is further configured to: for the each of the phrases in the set, multiply the similarity between the candidate keywords and the phrase by the term frequency inverse document frequency of the phrase in the target text, and add multiplication products to obtain the relevance of the candidate keywords to the target text.

In some embodiments, the apparatus further comprises: an establishing unit, configured to establish a correspondence relationship between the to-be-pushed candidate keyword and the target text; and a second pushing unit, configured to in response to detecting a searching operation of a second user terminal to the to-be-pushed candidate keyword, push a text corresponding to the to-be-pushed candidate keyword to the second user terminal.

In some embodiments, the first calculation unit includes: a first counting module, configured to count an inverse document frequency of the each of the phrases appearing in a preset text set; a second counting module, configured to count a frequency of the each of the phrases in the target text; and a calculation module, configured to calculate a product of the inverse document frequency and the frequency as the term frequency inverse document frequency of the phrases.

In some embodiments, the apparatus further comprises: a deleting unit, configured to delete stop words from the set of phrases.

Based on the similarities between the each of the phrases in the target text and the candidate keywords and the term frequency inverse document frequency of the each of the phrases in the target text, the method and apparatus for pushing information provided by the present disclosure obtains the relevance of the candidate keywords to the target text, and pushes information based on the relevance, thereby improving the accuracy of information pushing.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
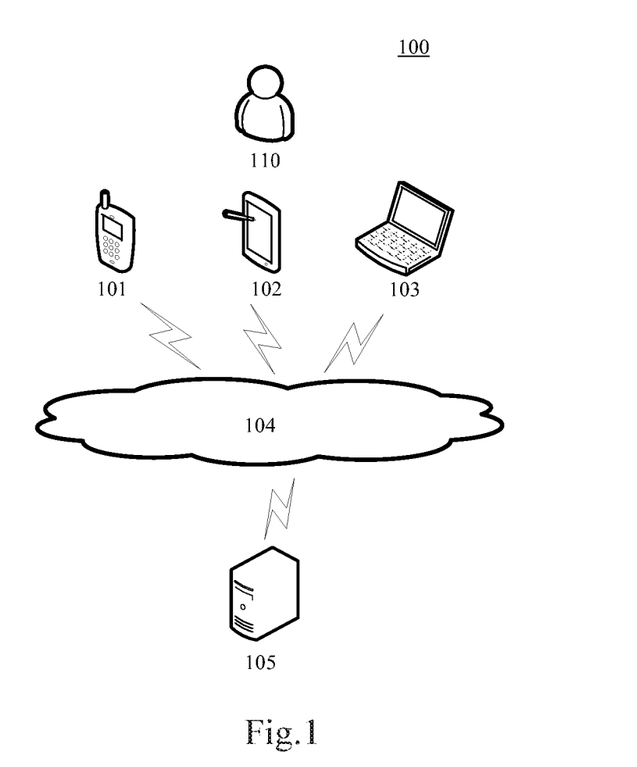
FIG. 1 is an exemplary system architecture diagram in which the present disclosure may be applied.

FIG. 1 shows an exemplary architecture of a system 100 which may be used by an information pushing method or an information pushing apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as shopping applications, search applications, web browsing applications, instant messaging tools, mailbox clients, social platform software. may be installed on the terminal devices 101, 102 and 103.

The terminal devices 101, 102 and 103 may be various electronic devices having a display screen and supporting data reception and transmission. The terminal devices 101, 102 and 103 may be the first user terminal devices, for example, the terminal devices where the advertiser is located. The terminal devices 101, 102 and 103 may also be the second user terminal devices, for example, the terminal devices where the search user is located.

The server 105 may be a server providing various services, for example, a backend server supporting the target text and candidate keywords. The server may provide processing such as analysis on the target text and candidate keywords, and return the processing results (for example, the to-be-pushed candidate keyword) to the terminal devices.

It should be noted that the information pushing method according to the embodiments of the present application is generally executed by the server 105. Accordingly, an information pushing apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
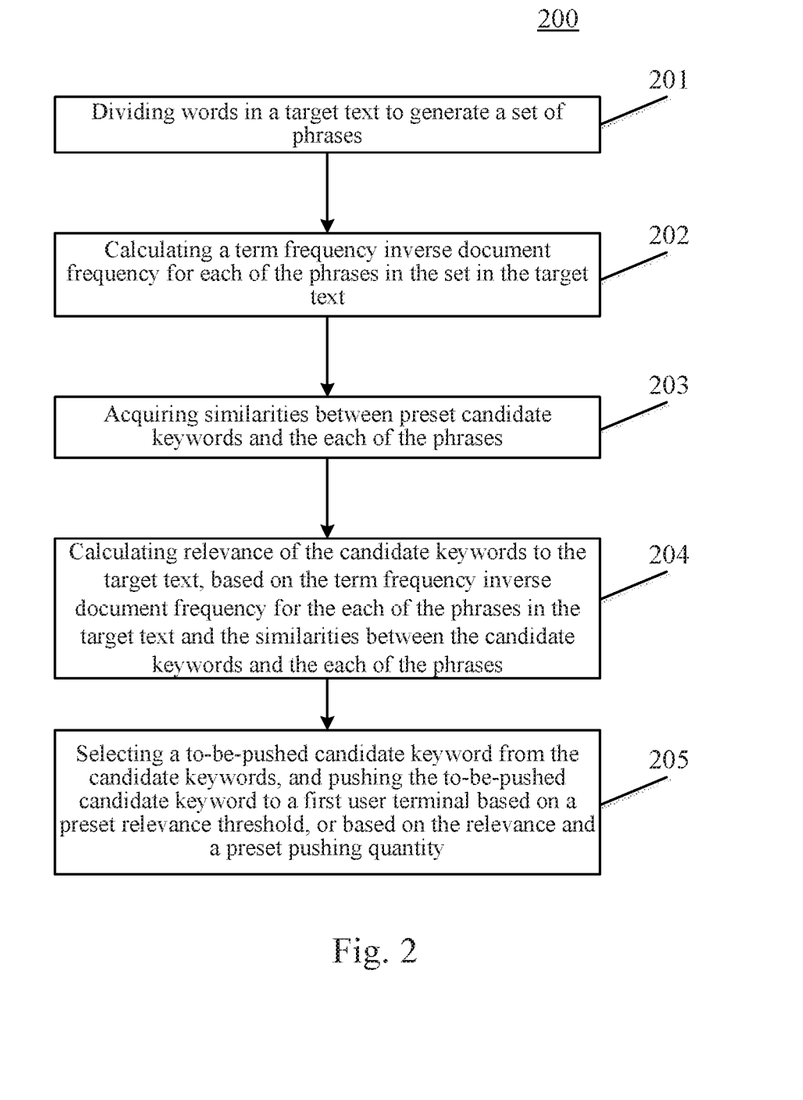
FIG. 2 is a flowchart of an embodiment of a method for pushing information according to the present disclosure.

With further reference to FIG. 2, a flow 200 of an embodiment of the method for pushing information according to the present disclosure is shown. The method for pushing information includes the following steps:

Step 201, dividing words in a target text to generate a set of phrases.

In the present embodiment, an electronic device (e.g., the server as illustrated in FIG. 1) on which the method for pushing information operate may divide words in a pre-acquired target text (for example, an advertising creative text), by means of wired connection or wireless connection, and generate a set of phrases. The electronic device may use a variety of word dividing methods to divide words in the target text, the word dividing methods including but are not limited to the Dictionary-based word dividing method (e.g., Maximum Matching algorithm, Proximity Matching algorithm, Shortest Path Matching algorithm and Statistics-based Shortest Path word dividing method, etc.), the Statistics-based word dividing method (for example, Statistics word dividing method adopting the N-gram model or the Hidden Markov Model (HMM)), the Rule-based word dividing method and the Chinese word dividing method based on artificial intelligence technology, etc. For example, when the target text is "travel around south and north and drink soy milk, home soy milk is still the best", it may be divided to words and the generated set of phrases may be "travel, travel around, south, north, south and north, soy milk, drink soy milk, is still, still, is, home, best, the best soy milk".

In some alternative implementations of the present embodiment, after generating the set of phrases, stop words may be deleted from the set of phrases. In the information search, in order to save storage space and improve the search efficiency, some words will be automatically filtered out before or after processing the natural language data (or text), these words are referred to as stop words. The stop words are all manually input rather than automatically generated. The generated stop words will form a stop words list. The electronic device may compare the phrases in the set of phrases with the words in the stop words list and delete the phrases appearing in the stop words list. For example, when "is still" appears in the stop words list, the "is still" is deleted from the set of phrases.

Step 202, calculating a term frequency inverse document frequency for each of the phrases in the set in the target text.

In the present embodiment, the electronic device may calculate the term frequency inverse document frequency of the each of the phrases of the set of phrases in the target text generated in step 201, which is also referred to as the term frequency-inverse document frequency (TF-IDF), that is to calculate the importance of the each of the phrases to the target text. The main idea of the term frequency-inverse document frequency method is that if a word or phrase appears at a high frequency (Term Frequency, TF) in an article and appears rarely in other articles, it is considered that the word or phrase possesses a very good category distinguishing ability and is suitable to be used for classifying. The inverse document frequency (IDF) mainly indicates that the less the documents containing a word or phrase are, the larger the IDF is, which means the word or phrase possesses a very good category distinguishing ability. Therefore, by using the term frequency-inverse document frequency method, the importance of a certain word or phrase in a certain article may be calculated.

In some alternative implementations of the present embodiment, the electronic device may first count the inverse document frequency of the each of the phrases in the preset text set, divide words for all the texts in the text set, count the inverse document frequency of the each of the phrases in the set of phrases of all the texts, and may also count the number of the texts containing each phrase in the individual texts in the preset text set, then divide the number of all the texts with the number of the texts containing the phrase to obtain the inverse document frequency of the phrase. Here, when the target text is an advertising creative text, the text set may be a set of all the advertising creative texts, or a set of advertising creative texts with the relevance to the target text greater than a preset relevance threshold, or a set of all the advertising creative texts in the account of the user to which the target text belong. Then, the electronic device may count the frequency of the each of the phrases appearing in the text set. Finally, a product of the counted inverse document frequency and the counted frequency may be determined as the term frequency inverse document frequency of the word.

Step 203, acquiring similarities between preset candidate keywords and the each of the phrases.

In the present embodiment, the electronic device may first acquire the preset candidate keywords, such as by adopting recommended algorithms (for example, the Collaborative Filtering algorithm, the content-based recommended algorithm) to acquire the candidate keywords. For example, when the collaborative filtering algorithm is adopted to acquire the user's candidate keywords, usually the first step is to collect the user's historical behavior data for the keywords, such as the user's purchase history, focus, favoring behavior, comments and scoring behavior. After that, based on the user's historical behaviour data, the similarities between the user and other users or the similarities between the user's interested keywords and other keywords is calculated using the similarity algorithm (for example, the Euclidean distance, the Pearson Correlation Coefficient, etc.) Finally, a neighbor user who has the same preference as the user may be found based on the user's preference for keywords, and the neighbor user's interested keywords may be selected as the candidate keywords, or other keywords with high similarities to the user's interested keywords may be selected as the candidate keywords. Then, it is possible to calculate the similarities between the candidate keywords and the each of the phrases, and well-known similarities calculation methods such as the cosine similarity algorithm may be used to perform the similarities calculation.

Step 204, calculating relevance of the candidate keywords to the target text, based on the term frequency inverse document frequency for the each of the phrases in the target text and the similarities between the candidate keywords and the each of the phrases.

In the present embodiment, the electronic device may calculate the relevance of the candidate keywords to the target text, based on the term frequency inverse document frequency of the each of the phrases in the target text calculated in step 202 and the similarities between the candidate keywords and the each of the phrases acquired in step 203. For example, the product of the term frequency inverse document frequency of the phrase with the maximum term frequency inverse document frequency and the similarities between the candidate keyword and the phrase may be determined as the relevance of the candidate keyword to the target text. Otherwise, the term frequency inverse document frequency of each phrase in the each of the phrases with the term frequency inverse document frequency greater than a preset frequency threshold may be multiplied by the similarity between the candidate keyword and the phrase, and then the product is added to obtain the relevance of the candidate keyword to the target text.

In some alternative implementations of the present embodiment, for each word in the text set, the term frequency inverse document frequency of the word in the target text may be multiplied by the similarity between the candidate keyword and the word, and by adding the obtained products, the relevance of the candidate keyword to the target text is obtained. The relevance of the candidate keyword to the target text may be calculated using the following equation (1).

$$sim(q, s) = \sum_{i} w_i * sim(q, s_i) \qquad (1)$$

Here, q is the candidate keyword, s is the target text, sim(q,s) is the relevance of the candidate keyword to the target text, $s_i$ is the $i^{th}$ phrase in the set of phrases, $sim(q,s_i)$ is the relevance of the candidate keyword to the $i^{th}$ phrase in the set of phrases, and $w_i$ is the term frequency inverse document frequency corresponding to $s_i$.

For example, when the target text is "travel around south and north and drink soy milk, home soy milk is still the best", the generated set of phrases may be "travel around, south and north, soy milk, drink soy milk, is still, home, the best soy milk", and the set of phrases removed of stop words may be "travel around, south and north, soy milk, drink soy milk, home, the best soy milk". The term frequency inverse document frequency of "travel around, south and north, soy milk, drink soy milk, home, the best soy milk" in the target text is 2.5, 3, 6, 3, 2, 3, respectively. The similarities between "travel around, south and north, soy milk, drink soy milk, home, the best soy milk" and the candidate keyword "soy juice" is 0, 0, 0.9, 0.7, 0, 0.7, respectively. Therefore, the relevance of the candidate keyword "soy juice" to the target text "travel around south and north and drink soy milk, home soy milk is still the best" is 9.6.

Step 205, selecting to-be-pushed candidate keyword from the candidate keywords, and pushing the to-be-pushed candidate keyword to a first user terminal based on a preset relevance threshold, or based on the relevance and a preset pushing quantity.

In the present embodiment, after calculating the relevance of the candidate keywords to the target text in step 204, the electronic device may select a candidate keyword greater than the preset relevance threshold from the candidate keywords as the to-be-pushed candidate keyword, or select a preset pushing number of candidate keywords from the candidate keywords according to the relevance in descending order as the to-be-pushed candidate keyword, and then push the to-be-pushed candidate keyword to the first user terminal. For example, when the first use terminal is the advertiser, the electronic device may push the to-be-pushed candidate keyword to the advertiser for the advertiser to purchase the candidate keywords.

The method provided by the above embodiment of the present disclosure is based on the similarities between the each of the phrases in the target text and the candidate keywords and the term frequency inverse document frequency of the each of the phrases in the target text, by obtaining the relevance of the candidate keywords to the target text and pushing information based on the relevance, it improves the accuracy of information pushing.

Figure 3:
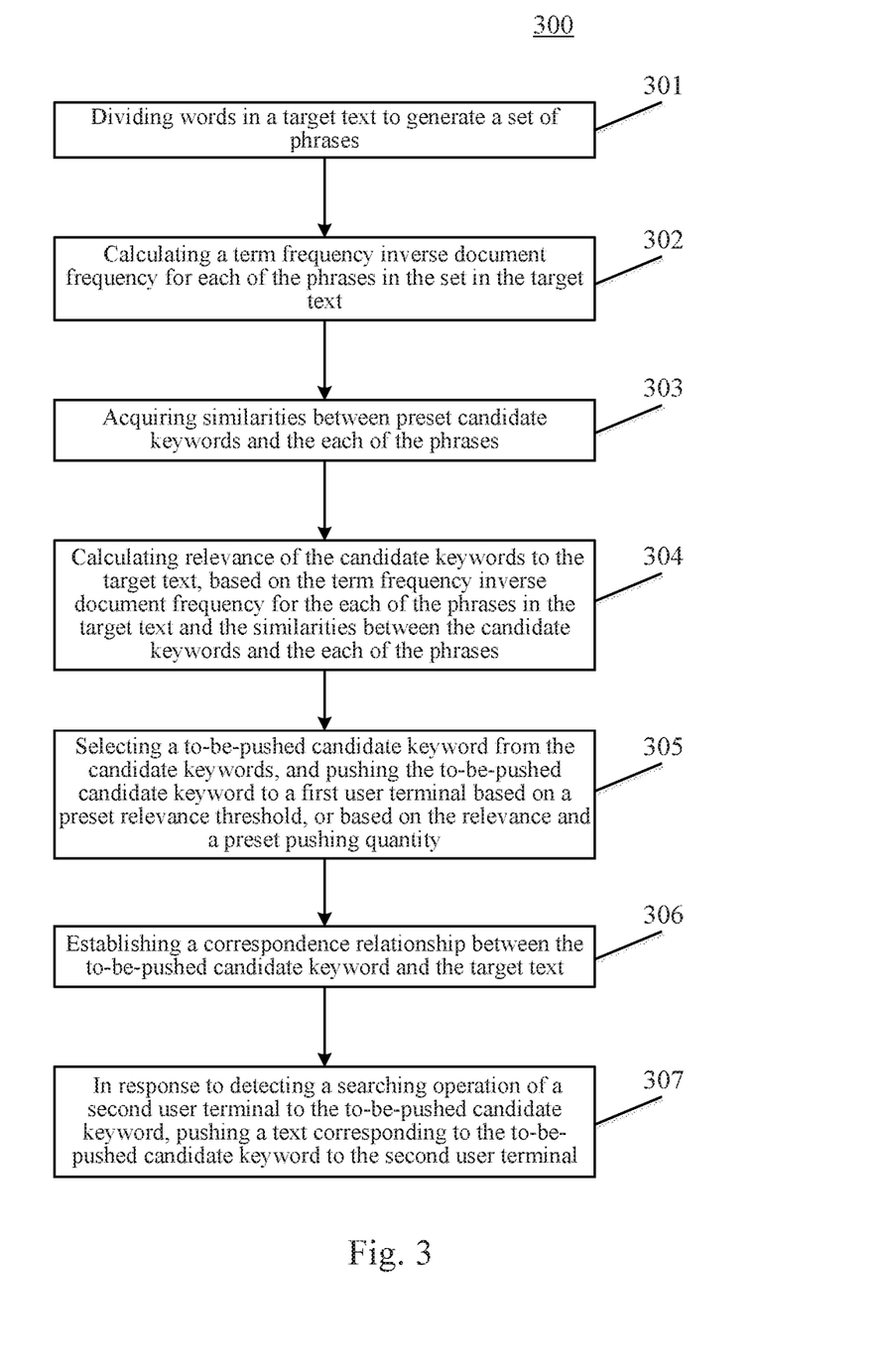
FIG. 3 is a flowchart of another embodiment of the method for pushing information according to the present disclosure.

With further reference to FIG. 3, a flow 300 of another embodiment of the method for pushing information is shown. The flow 300 of the method for pushing information includes the following steps:

Step 301, dividing words in a target text to generate a set of phrases.

In the present embodiment, an electronic device (e.g., the server as illustrated in FIG. 1) on which the method for pushing information operate may divide words in a pre-acquired target text (for example, an advertising creative text), by means of wired connection or wireless connection, and generate a set of phrases. The electronic device may use a variety of word dividing methods to divide words in the target text, the word dividing methods including but are not limited to the dictionary-based word dividing method (e.g., maximum matching algorithm, proximity matching algorithm, shortest path matching algorithm and statistics-based shortest path word dividing method, etc.), the statistics-based word dividing method (for example, statistics word dividing method adopting the N-gram model or the hidden Markov Model), the rule-based word dividing method and the Chinese word dividing method based on artificial intelligence technology, etc.

Step 302, calculating a term frequency inverse document frequency for each of the phrases in the set in the target text.

In the present embodiment, the electronic device may calculate the term frequency inverse document frequency of the each of the phrases of the set of phrases in the target text generated in step 301, which is also referred to as the term frequency-inverse document frequency, that is to calculate the importance of the each of the phrases to the target text. The main idea of the term frequency-inverse document frequency method is that if a word or phrase appears at a high frequency in an article and appears rarely in other articles, it is considered that the word or phrase possesses a very good category distinguishing ability and is suitable to be used for classifying. The inverse document frequency mainly indicates that the less the documents containing a word or phrase are, the larger the IDF is, which means the word or phrase possesses a very good category distinguishing ability. Therefore, by using the term frequency-inverse document frequency method, the importance of a certain word or phrase in a certain article may be calculated.

Step 303, acquiring similarities between preset candidate keywords and the each of the phrases.

In the present embodiment, the electronic device may first acquire the preset candidate keywords, such as by adopting recommended algorithms (for example, the collaborative filtering algorithm, the content-based recommended algorithm) to acquire the candidate keywords. For example, when the collaborative filtering algorithm is adopted to acquire the user's candidate keywords, usually the first step is to collect the user's historical behavior data for the keywords, such as the user's purchase history, focus, favoring behavior, comments and scoring behavior. After that, based on the user's historical behaviour data, the similarities between the user and other users or the similarities between the user's interested keywords and other keywords is calculated using the similarity algorithm (for example, the Euclidean distance, the Pearson Correlation Coefficient, etc.) Finally, a neighbor user who has the same preference as the user may be found based on the user's preference for keywords, and the neighbor user's interested keywords may be selected as the candidate keywords, or other keywords with high similarities to the user's interested keywords may be selected as the candidate keywords. Then, it is possible to calculate the similarities between the candidate keywords and the each of the phrases, and well-known similarities calculation methods such as the cosine similarity algorithm may be used to perform the similarity calculation.

Step 304, calculating relevance of the candidate keywords to the target text, based on the term frequency inverse document frequency for the each of the phrases in the target text and the similarities between the candidate keywords and the each of the phrases.

In the present embodiment, the electronic device may calculate the relevance of the candidate keywords to the target text, based on the term frequency inverse document frequency of the each of the phrases in the target text calculated in step 302 and the similarities between the candidate keywords and the each of the phrases acquired in step 303. For example, the similarity between each phrase in the each of the phrases and the candidate keyword greater than a preset similarity threshold may be multiplied by the term frequency inverse document frequency of the phrase, and then the product is added to obtain the relevance of the candidate keyword to the target text.

Step 305, selecting a to-be-pushed candidate keyword from the candidate keywords, and pushing the to-be-pushed candidate keyword to a first user terminal based on a preset relevance threshold, or based on the relevance and a preset pushing quantity.

In the present embodiment, after calculating the relevance of the candidate keywords to the target text in step 304, the electronic device may select a candidate keyword greater than the preset relevance threshold from the candidate keywords as the to-be-pushed candidate keyword, or select a preset pushing number of candidate keywords from the candidate keywords according to the relevance in descending order as the to-be-pushed candidate keyword.

Step 306, establishing a correspondence relationship between the to-be-pushed candidate keyword and the target text.

In the present embodiment, the electronic device may establish a correspondence relationship between the to-be-pushed candidate keyword selected in step 305 and the target text. Here, a target text may correspond to a plurality of candidate keywords to be pushed, and a to-be-pushed candidate keyword may also correspond to a plurality of texts.

Step 307, in response to detecting a searching operation of a second user terminal to the to-be-pushed candidate keyword, pushing a text corresponding to the to-be-pushed candidate keyword to the second user terminal.

In the present embodiment, upon detecting a searching operation of the second user terminal to the to-be-pushed candidate keyword, a text corresponding to the searched to-be-pushed candidate keyword may be pushed to the second user terminal. The electronic device may first acquire a text set corresponding to the to-be-pushed candidate keyword searched by the second user terminal, then push all the texts corresponding to the searched to-be-pushed candidate keyword, or may push a preset number of texts in the text set corresponding to the to-be-pushed candidate keyword. For example, when the to-be-pushed candidate keyword searched by the user is "soy milk", the text set "travel around south and north and drink soy milk, home soy milk is still the best", "a cup of soy milk, bring you the taste of homeland" and "let the mellow smell wake up your vitality" corresponding to "soy milk" may be first acquired. Then, all the texts in the text set may be pushed to the user, or any text in the text set may be pushed to the user.

As can be seen from FIG. 3, the flow 300 of the method for pushing information in the present embodiment, as compared with the embodiment corresponding to FIG. 2, highlights the step 306 of establishing a correspondence relationship between the to-be-pushed candidate keyword and the target text and the step 307 of in response to detecting a searching operation of a second user terminal to the to-be-pushed candidate keyword, pushing a text corresponding to the to-be-pushed candidate keyword to the second user terminal. Thus, the solution described in the present embodiment may be applied to searching of the searching end regarding pushing of the text corresponding to the candidate keyword to be pushed, thereby further improving the accuracy of the information pushing.

Figure 4:
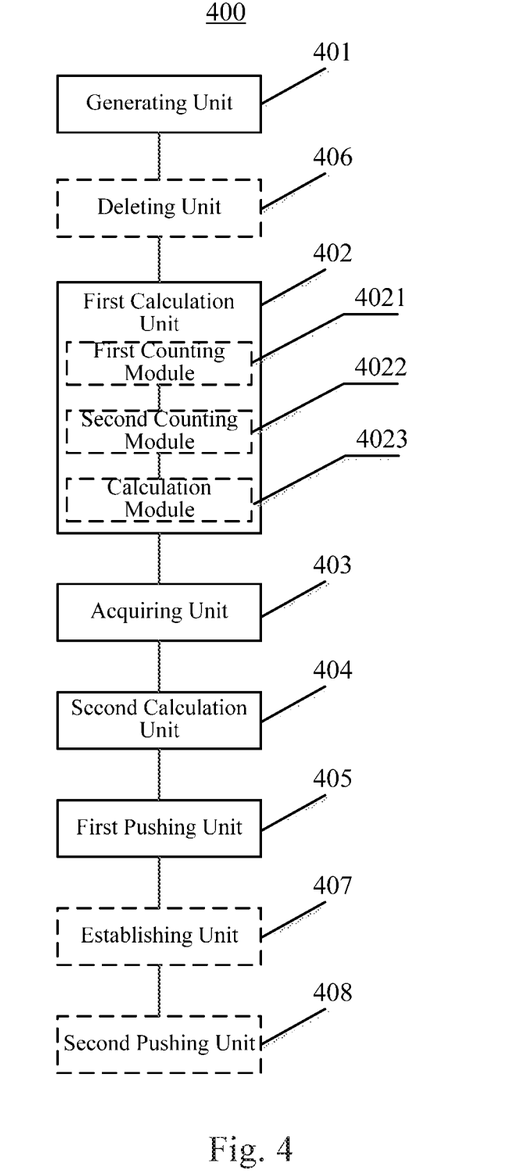
FIG. 4 is a schematic structural diagram of an embodiment of an apparatus for pushing information according to the present disclosure.

With further reference to FIG. 4, as an implementation of the method shown in the above figures, the present disclosure provides an embodiment of an apparatus for pushing information. The apparatus embodiment corresponds to the method embodiment shown in FIG. 2, and the apparatus may be specifically applied to various electronic devices.

As shown in FIG. 4, the apparatus 400 for pushing information of the present embodiment includes: a generating unit 401, a first calculation unit 402, an acquiring unit 403, a second calculation unit 404 and a first pushing unit 405. The generating unit 401 is configured to divide words in a target text to generate a set of phrases. The first calculation unit 402 is configured to calculate a term frequency inverse document frequency for each of the phrases in the set in the target text. The acquiring unit 403 is configured to acquire similarities between preset candidate keywords and the each of the phrases. The second calculation unit 404 is configured to calculate relevance of the candidate keywords to the target text, based on the term frequency inverse document frequency for the each of the phrases in the target text and the similarities between the candidate keywords and the each of the phrases. The first pushing unit 405 is configured to select a to-be-pushed candidate keyword from the candidate keywords, and pushing the to-be-pushed candidate keyword to a first user terminal based on a preset relevance threshold, or based on the relevance and a preset pushing quantity.

In the present embodiment, the generation unit 401 of the apparatus 400 for pushing information may divide words in a pre-acquired target text, by means of wired connection or wireless connection, and generate a set of phrases. The electronic device may use a variety of word dividing methods to divide words in the target text, the word dividing methods including but are not limited to the dictionary-based word dividing method, the statistics-based word dividing method, the rule-based word dividing method and the Chinese word dividing method based on artificial intelligence technology, etc.

In the present embodiment, the first calculation unit 402 may calculate the term frequency inverse document frequency of the each of the phrases of the set of phrases in the target text generated by the generation unit 401, which is also referred to as the term frequency-inverse document frequency, that is to calculate the importance of the each of the phrases to the target text. The main idea of the term frequency-inverse document frequency method is that if a word or phrase appears at a high frequency in an article and appears rarely in other articles, it is considered that the word or phrase possesses a very good category distinguishing ability and is suitable to be used for classifying. The inverse document frequency mainly indicates that the less the documents containing a word or phrase are, the larger the IDF is, which means the word or phrase possesses a very good category distinguishing ability. Therefore, by using the term frequency-inverse document frequency method, the importance of a certain word or phrase in a certain article may be calculated.

In the present embodiment, the acquisition unit 403 may first acquire the preset candidate keywords, such as by adopting recommended algorithms to acquire the candidate keywords. For example, when the collaborative filtering algorithm is adopted to acquire the user's candidate keywords, usually the first step is to collect the user's historical behavior data for the keywords, such as the user's purchase history, focus, favoring behavior, comments and scoring behavior. After that, based on the user's historical behaviour data, the similarities between the user and other users or the similarities between the user's interested keywords and other keywords is calculated using the similarity algorithm. Finally, a neighbor user who has the same preference as the user may be found based on the user's preference for keywords, and the neighbor user's interested keywords may be selected as the candidate keywords, or other keywords with high similarities to the user's interested keywords may be selected as the candidate keywords. Then, it is possible to calculate the similarities between the candidate keywords and the each of the phrases, and well-known similarity calculation methods such as the cosine similarity algorithm may be used to perform the similarity calculation.

In the present embodiment, the second calculation unit 404 may calculate the relevance of the candidate keywords to the target text, based on the term frequency inverse document frequency of the each of the phrases in the target text calculated by the first calculation unit 402 and the similarities between the candidate keywords and the each of the phrases acquired by the acquisition unit 403. For example, the product of the term frequency inverse document frequency of the phrase with the maximum term frequency inverse document frequency and the similarities between the candidate keyword and the phrase may be determined as the relevance of the candidate keyword to the target text. Otherwise, the term frequency inverse document frequency of each phrase in the each of the phrases with the term frequency inverse document frequency greater than a preset frequency threshold may be multiplied by the similarity between the candidate keyword and the phrase, and then the product is added to obtain the relevance of the candidate keyword to the target text.

In the present embodiment, after the second calculation unit 404 calculates the relevance of the candidate keywords to the target text, the first pushing unit 405 may select a candidate keyword greater than the preset relevance threshold from the candidate keywords as the to-be-pushed candidate keyword, or select a preset pushing number of candidate keywords from the candidate keywords according to the relevance in descending order as the candidate keywords to be pushed, and then push the candidate keywords to be pushed to the first user terminal.

In some alternative implementations of the present embodiment, for each word in the text set, the second calculation unit 404 may multiply the term frequency inverse document frequency of the word in the target text by the similarity between the candidate keyword and the word, and by adding the obtained products, the relevance of the candidate keyword to the target text is obtained. The second calculation unit 404 may calculate the relevance of the candidate keyword to the target text using the following equation (1).

$$sim(q, s) = \sum_i w_i * sim(q, s_i) \tag{1}$$

Here, q is the candidate keyword, s is the target text, sim(q,s) is the relevance of the candidate keyword to the target text, $s_i$ is the $i^{th}$ phrase in the set of phrases, sim(q,$s_i$) is the relevance of the candidate keyword to the $i^{th}$ phrase in the set of phrases, and $w_i$ is the term frequency inverse document frequency corresponding to $s_i$.

In some alternative implementations of the present embodiment, the apparatus 400 for pushing information may further comprises an establishing unit 407 and a second pushing unit 408. Wherein the establishing unit 407 is configured to establish a correspondence relationship between the to-be-pushed candidate keyword selected by the first pushing unit 405 and the target text. Here, a target text may correspond to a plurality of candidate keywords to be pushed, and a to-be-pushed candidate keyword may also correspond to a plurality of texts. Upon detecting a searching operation of the second user terminal to the to-be-pushed candidate keyword, the second pushing unit 408 may push a text corresponding to the searched to-be-pushed candidate keyword to the second user terminal. The second pushing unit 408 may first acquire a text set corresponding to the to-be-pushed candidate keyword searched by the second user terminal, then push all the texts corresponding to the searched to-be-pushed candidate keyword, or may push a preset number of texts in the text set corresponding to the to-be-pushed candidate keyword.

In some alternative implementations of the present embodiment, the first calculation unit 402 may include a first counting module 4021, a second counting module 4022 and a calculation module 4023. Wherein the first counting module 4021 may first count an inverse document frequency of the each of the phrases appearing in a preset text set, divide words for all the texts in the text set, count the inverse document frequency of the each of the phrases in the set of phrases of all the texts, and may also count the number of the texts containing each phrase in the individual texts in the preset text set, then divide the number of all the texts with the number of the texts containing the phrase to obtain the inverse document frequency of the phrase. Here, when the target text is an advertising creative text, the text set may be a set of all the advertising creative texts, or a set of advertising creative texts with the relevance to the target text greater than a preset relevance threshold, or a set of all the advertising creative texts in the account of the user to which the target text belong. After that, the second counting module 4022 may count a frequency of the each of the phrases appearing in the target text. Finally, the calculation module 4023 may calculate a product of the counted inverse document frequency and the counted frequency as the term frequency inverse document frequency of the word.

In some alternative implementations of the present embodiment, the apparatus 400 for pushing information may further comprises a deleting unit 406. After generating the set of phrases, the deleting unit 406 may delete stop words from the set of phrases. In the information search, in order to save storage space and improve the search efficiency, some words will be automatically filtered out before or after processing the natural language data (or text), these words are referred to as stop words. The stop words are all manually input rather than automatically generated. The generated stop words will form a stop words list. The deleting unit 406 may compare the phrases in the set of phrases with the words in the stop words list and delete the phrases appearing in the stop words list.

Figure 5:
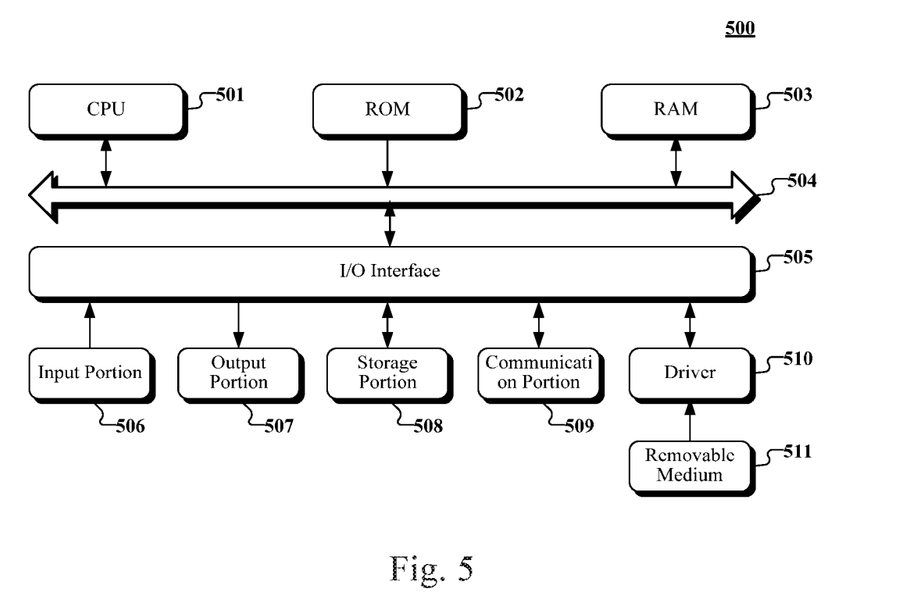
FIG. 5 is a schematic structural diagram of a computer system adapted to implement a server according to embodiments of the present disclosure.

Referring to FIG. 5, a schematic structural diagram of a computer system 500 adapted to implement a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a generating unit, a first calculation unit, an acquiring unit, a second calculation unit and a first pushing unit, where the names of these units or modules are not considered as a limitation to the units or modules. For example, the generating unit may also be described as "a unit for blocking a malicious website."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: dividing words in a target text to generate a set of phrases; calculating a term frequency inverse document frequency for each of the phrases in the set in the target text; acquiring similarities between preset candidate keywords and the each of the phrases; calculating relevance of the candidate keywords to the target text, based on the term frequency inverse document frequency for the each of the phrases in the target text and the similarities between the candidate keywords and the each of the phrases; and selecting a to-be-pushed candidate keyword from the candidate keywords, and pushing the to-be-pushed candidate keyword to a first user terminal based on a preset relevance threshold, or based on the relevance and a preset pushing quantity.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for pushing information, comprising:
   dividing words in a target text to generate a set of phrases;
   calculating a term frequency inverse document frequency for each of the phrases in the set in the target text;
   acquiring similarities between preset candidate keywords of an advertiser and the each of the phrases, wherein the preset candidate keywords of the advertiser are determined based on historical behavior data of the advertiser on a network, wherein the historical behavior data of the advertiser comprises a history of purchasing keywords by the advertiser on the network;
   calculating relevance of the candidate keywords to the target text, based on the term frequency inverse document frequency for the each of the phrases in the target text and the similarities between the candidate keywords and the each of the phrases; and
   selecting a to-be-pushed candidate keyword from the candidate keywords based on a preset relevance threshold, or based on the relevance and a preset pushing quantity, and pushing the to-be-pushed candidate keyword to a first user terminal used by the advertiser, wherein the pushed to-be-pushed candidate keyword is purchased by the advertiser;
   establishing a correspondence relationship between the pushed to-be-pushed candidate keyword and the target text; and
   in response to detecting a search for the to-be-pushed candidate keyword by a second user terminal, acquiring the target text corresponding to the to-be-pushed candidate keyword of the search based on the correspondence and pushing the target text to the second user terminal, wherein the advertiser is charged in response to clicking the pushed target text.

2. The method according to claim 1, wherein the calculating relevance of the candidate keywords to the target text, based on the term frequency inverse document frequency for the each of the phrases in the target text and the similarities between the candidate keywords and the each of the phrases comprises:
   for the each of the phrases in the set, multiplying the similarity between the candidate keywords and the phrase by the term frequency inverse document frequency of the phrase in the target text, and adding multiplication products to obtain the relevance of the candidate keywords to the target text.

3. The method according to claim 1, wherein the calculating a term frequency inverse document frequency of each of the phrases in the set in the target text, comprises:
   counting an inverse document frequency of the each of the phrases appearing in a preset text set;
   counting a frequency of the each of the phrases in the target text; and
   calculating a product of the inverse document frequency and the frequency as the term frequency inverse document frequency of the phrases.

4. The method according to claim 1, wherein after the generating a set of phrases, the method further comprises: deleting stop words from the set of phrases.

5. An apparatus for pushing information, comprising:
   at least one processor; and
   a memory storing instructions, which when executed by the at least one processor, cause the at least one processor to perform operations, the operations comprising:
   dividing words in a target text to generate a set of phrases;
   calculating a term frequency inverse document frequency for each of the phrases in the set in the target text;
   acquiring similarities between preset candidate keywords of an advertiser and the each of the phrases, wherein the preset candidate keywords of the advertiser are determined based on historical behavior data of the advertiser on a network, wherein the historical behavior data of the advertiser comprises a history of purchasing keywords by the advertiser on the network;

calculating relevance of the candidate keywords to the target text, based on the term frequency inverse document frequency for the each of the phrases in the target text and the similarities between the candidate keywords and the each of the phrases; and selecting a to-be-pushed candidate keyword from the candidate keywords based on a preset relevance threshold, or based on the relevance and a preset pushing quantity, and pushing the to-be-pushed candidate keyword to a first user terminal used by the advertiser, wherein the pushed to-be-pushed candidate keyword is purchased by the advertiser;

establishing a correspondence relationship between the pushed to-be-pushed candidate keyword and the target text; and in response to detecting a search for the to-be-pushed candidate keyword by a second user terminal, acquiring the target text corresponding to the to-be-pushed candidate keyword of the search based on the correspondence and pushing the target text to the second user terminal, wherein the advertiser is charged in response to clicking the pushed target text.

6. The apparatus according to claim 5, wherein the calculating relevance of the candidate keywords to the target text, based on the term frequency inverse document frequency for the each of the phrases in the target text and the similarities between the candidate keywords and the each of the phrases comprises:

for the each of the phrases in the set, multiplying the similarity between the candidate keywords and the phrase by the term frequency inverse document frequency of the phrase in the target text, and adding multiplication products to obtain the relevance of the candidate keywords to the target text.

7. The apparatus according to claim 5, wherein the calculating a term frequency inverse document frequency of each of the phrases in the set in the target text, comprises:

counting an inverse document frequency of the each of the phrases appearing in a preset text set;

counting a frequency of the each of the phrases in the target text; and calculating a product of the inverse document frequency and the frequency as the term frequency inverse document frequency of the phrases.

8. The apparatus according to claim 5, wherein the operations further comprise:

deleting stop words from the set of phrases.

9. A non-transitory computer storage medium storing a computer program, which when executed by one or more processors, cause the one or more processors to perform operations, the operations comprising:

dividing words in a target text to generate a set of phrases;

calculating a term frequency inverse document frequency for each of the phrases in the set in the target text;

acquiring similarities between preset candidate keywords of an advertiser and the each of the phrases, wherein the preset candidate keywords of the advertiser are determined based on historical behavior data of the advertiser on a network, wherein the historical behavior data of the advertiser comprises a history of purchasing keywords by the advertiser on the network;

calculating relevance of the candidate keywords to the target text, based on the term frequency inverse document frequency for the each of the phrases in the target text and the similarities between the candidate keywords and the each of the phrases; and selecting a to-be-pushed candidate keyword from the candidate keywords based on a preset relevance threshold, or based on the relevance and a preset pushing quantity, and pushing the to-be-pushed candidate keyword to a first user terminal used by advertiser, wherein the pushed to-be-pushed candidate keyword is purchased by the advertiser;

establishing a correspondence relationship between the pushed to-be-pushed candidate keyword and the target text; and in response to detecting a search for the to-be-pushed candidate keyword by a second user terminal, acquiring the target text corresponding to the to-be-pushed candidate keyword of the search based on the correspondence and pushing to the target text to the second user terminal, wherein the advertiser is charged in response to clicking the pushed target text.

10. The non-transitory computer storage medium according to claim 9, wherein the calculating relevance of the candidate keywords to the target text, based on the term frequency inverse document frequency for the each of the phrases in the target text and the similarities between the candidate keywords and the each of the phrases comprises:

for the each of the phrases in the set, multiplying the similarity between the candidate keywords and the phrase by the term frequency inverse document frequency of the phrase in the target text, and adding multiplication products to obtain the relevance of the candidate keywords to the target text.

11. The non-transitory computer storage medium according to claim 9, wherein the calculating a term frequency inverse document frequency of each of the phrases in the set in the target text, comprises:

counting an inverse document frequency of the each of the phrases appearing in a preset text set;

counting a frequency of the each of the phrases in the target text; and calculating a product of the inverse document frequency and the frequency as the term frequency inverse document frequency of the phrases.

12. The non-transitory computer storage medium according to claim 9, wherein after the generating a set of phrases, the method further comprises: deleting stop words from the set of phrases.

* * * * *

UNITED STATES PATENT AND TRADEMARK OFFICE
CERTIFICATE OF CORRECTION

PATENT NO. : 10,726,446 B2
APPLICATION NO. : 15/617337
DATED : July 28, 2020
INVENTOR(S) : Wei et al.

Page 1 of 1

It is certified that error appears in the above-identified patent and that said Letters Patent is hereby corrected as shown below:

On the Title Page

At Item (30) (Foreign Application Priority Data), please insert --(CN) 201611216735--.

Signed and Sealed this
Second Day of March, 2021

Drew Hirshfeld
*Performing the Functions and Duties of the
Under Secretary of Commerce for Intellectual Property and
Director of the United States Patent and Trademark Office*